United States Patent [19]

Vertin

[11] Patent Number: 5,073,824
[45] Date of Patent: Dec. 17, 1991

[54] REMOTE CONTROL AND CAMERA COMBINATION

[76] Inventor: Gregory D. Vertin, 451 Douglas St., Joliet, Ill. 60435

[21] Appl. No.: 539,410

[22] Filed: Jun. 15, 1990

[51] Int. Cl.$^5$ ............................................. H04N 5/30
[52] U.S. Cl. ................................. 358/210; 358/209; 358/229
[58] Field of Search ............ 358/210, 108, 185, 194.1, 358/209, 109; 340/825.71, 825.72; 455/603

[56] References Cited

U.S. PATENT DOCUMENTS

| | | | |
|---|---|---|---|
| 4,673,268 | 6/1987 | Wheeler et al. | 352/243 |
| 4,716,465 | 12/1987 | Meyer | 358/210 |
| 4,855,838 | 8/1989 | Jones et al. | 358/229 |
| 4,974,088 | 11/1990 | Sasaki | 358/210 |

Primary Examiner—Howard W. Britton
Assistant Examiner—Tuan V. Ho
Attorney, Agent, or Firm—Ernest Kettelson

[57] ABSTRACT

A remote control camera apparatus comprising a video camera or motion picture camera mounted on a tripod, and the camera having a first servo motor to rotate the camera throughout a 360 degree horizontal arc, and a second servo motor to pivot the camera throughout a 180 degree vertical arc. Each servo motor is controlled by an electrical circuit having a receiver to receive radio frequency signals transmitted by a remote control transmitter with said radio frequency signals including an operating control signal to signal each of the servo motors when to start, when to stop, and in what direction to rotate. A laser transmitter, capable of being turned on and off by the remote transmitter, is mounted on or adjacent to the camera to direct a visible laser beam parallel to and slightly above the axis of the camera lens so that the visible laser beam hits slightly above and in line with the center of the area the camera lens is focused on. The laser transmitter enables a person manipulating a camera or plurality of cameras from a remote location to see when each camera is focused on the subject to be shown in the picture. After the camera is focused on the subject, the remote control transmitter turns off the laser beam and turns on the camera until the shooting is complete whereupon the remote transmitter turns off the camera.

22 Claims, 6 Drawing Sheets

REMOTE CONTROL AND CAMERA COMBINATION

BACKGROUND OF THE INVENTION

This invention relates to the field of remote control cameras, and in particular to remote control cameras that utilize a laser beam to indicate a spot just above the focal center point of the field being viewed by the camera thereby allowing a person manipulating the camera from a remote location to see what the camera is focused on.

Prior art remote control camera designs have been aimed at utilizing a television monitor and a person stationed at the monitor to determine the field of view of the camera and to manipulate the camera to view the desired area. No remote control camera design has addressed the problem of providing the center of the field of view to the person manipulating the camera controls when that person is in the field of view of the camera and a television monitor is not available, or due to location, the use of a television monitor would not be feasible.

The problem with prior art remote control camera designs is that they need a television monitor and a person viewing the monitor to manipulate the camera remotely to view the desired area. It is common for a person to operate a camera remotely without the benefit of a television monitor when making family videos. The camera operator positions the camera, then moves into the field of view, only to have the movie subjects move thereby forcing the camera operator to remotely adjust the camera to a new field of view, the center of which is unknown to the camera operator. When these problems occur, a visual indicating device, a laser beam generator connected to the camera, disclosing the center of the field of view to the camera operator while the camera operator is within the camera's field of view must be utilized.

Examples of prior art devices include those disclosed in the following U.S. patents:

U.S. Pat. No. 4,855,838 discloses a remote controlled pan and tilt television camera for inspecting pipeline interiors. The problem with this device is that it requires a television monitor to disclose the field of view. The device is designed specifically for use inside pipelines thereby precluding the camera operator from appearing within the camera's field of view. Another problem with this device is that the camera is controlled via a cable link up to the controller. This control method would be an intrusion and a hindrance when making family videos.

U.S. Pat. No. 4,716,465 discloses a wireless remote controlled still camera having vertical, horizontal, and focusing adjustment means controlled by a remote transmitter. The problem with this device is that a person controlling the adjustment of the camera while in the camera's field of view has no means to judge what that field of view is once the camera is moved from its initial position.

U.S. Pat. No. 4,709,265 discloses a surveillance system for hazardous environments having a radio remote controlled vehicle that is capable of taking samples from floor and equipment surfaces in nuclear power plants and hazardous waste storage areas.

U.S. Pat. No. 4,662,004 discloses an atmospheric optical communications link which compensates for variations caused by changes in the atmospheric transmission medium.

U.S. Pat. No. 4,051,534 discloses a small head mounted television camera that transmits a picture of the operations performed by the wearer of the camera to be remotely viewed on a television monitor.

U.S. Pat. No. 3,916,094 discloses a visual simulator for obtaining the illusion of control in a remotely controlled vehicle comprising two television camera systems which are coupled to a cathode ray tube display carried by the head gear of an operator of the remote controlled vehicle. A video switch combines the images recorded by the two television cameras into a single display.

U.S. Pat. No. 3,803,399 discloses a target illuminator utilizing a laser to illuminate a target in a field of view cluttered with objects of similar size and shape.

U.S. Pat. No. 3,711,638 discloses a weapon control system comprising a closed circuit television monitor at a control station that enables an operator to vary the position of a camera and weapon that are remotely positioned and in proximity to a target. The system allows the operator to track a target, position the weapon, fire the weapon, then determine if the target has been hit, and repeat the procedure if the target was not hit.

U.S. Pat. No. 3,437,748 discloses a motion picture camera system comprising a motion picture camera mounted on support means that permit linear and rotary camera movement. A television camera is cooperatively mounted with the motion picture camera on the support means to view the image recorded by the motion picture camera. A television receiver and monitor are remotely located adjacent to controls that are connected to the support means via a cable. A person viewing the television monitor has the capability of controlling movement of the motion picture camera from a remote position.

U.S. Pat. No. 3,164,838 discloses a panning and tilting mount for a camera comprising a television camera that automatically scans a given area and relays such information back to a central location for display on a television monitor.

U.S. Pat. No. 2,816,475 discloses a camera field of view indicator comprising a television camera having a light beam source attached thereto that projects bright lines along the edges of the field of view when the television camera is not in operation.

U.S. Pat. No. 2,527,436 discloses a warning system that indicates when a microphone enters an area near the field of view of a television camera. A beam of light is projected from the camera such that the beam is at a slightly wider angle than the field of view of the camera. A photocell is attached to the bottom of the microphone to initiate a warning signal once the photocell detects the light beam.

U.S. Pat. No. 2,516,069 discloses a remote control camera television system that allows a person to control the horizontal, vertical, and focusing movements of a television camera when the television receiver and controlling means, where the person is stationed, are remote from the camera.

SUMMARY OF THE INVENTION

It is an object of the invention to provide a remote control camera having a first servo motor to rotate the camera throughout a 360 degree horizontal arc.

It is an object of the invention to provide a remote control camera having a second servo motor to rotate the camera throughout a 180 degree vertical arc.

It is an object of the invention to provide a remote control camera having a receiver mounted thereto to receive radio frequency signals transmitted from a remote radio frequency transmitter that instructs each servo motor when to start, when to stop, and in what direction to rotate.

It is an object of the invention to provide a remote control camera having a laser transmitter mounted thereto to direct a visible laser beam parallel to and slightly above the axis of the camera lens so that the visible laser beam hits slightly above and in line with the center of the area the camera lens is focused on to enable a person manipulating the camera via the radio frequency transmitter from a remote location to see when the camera is focused on the subject to be shown in the picture.

It is an object of the invention to provide a remote control camera having said receiver receive radio frequency signals from said remote radio frequency transmitter with said signals instructing said camera when to start and stop, and instructing said laser transmitter when to turn on and turn off.

DESCRIPTION OF PREFERRED EMBODIMENT

Figure 1:
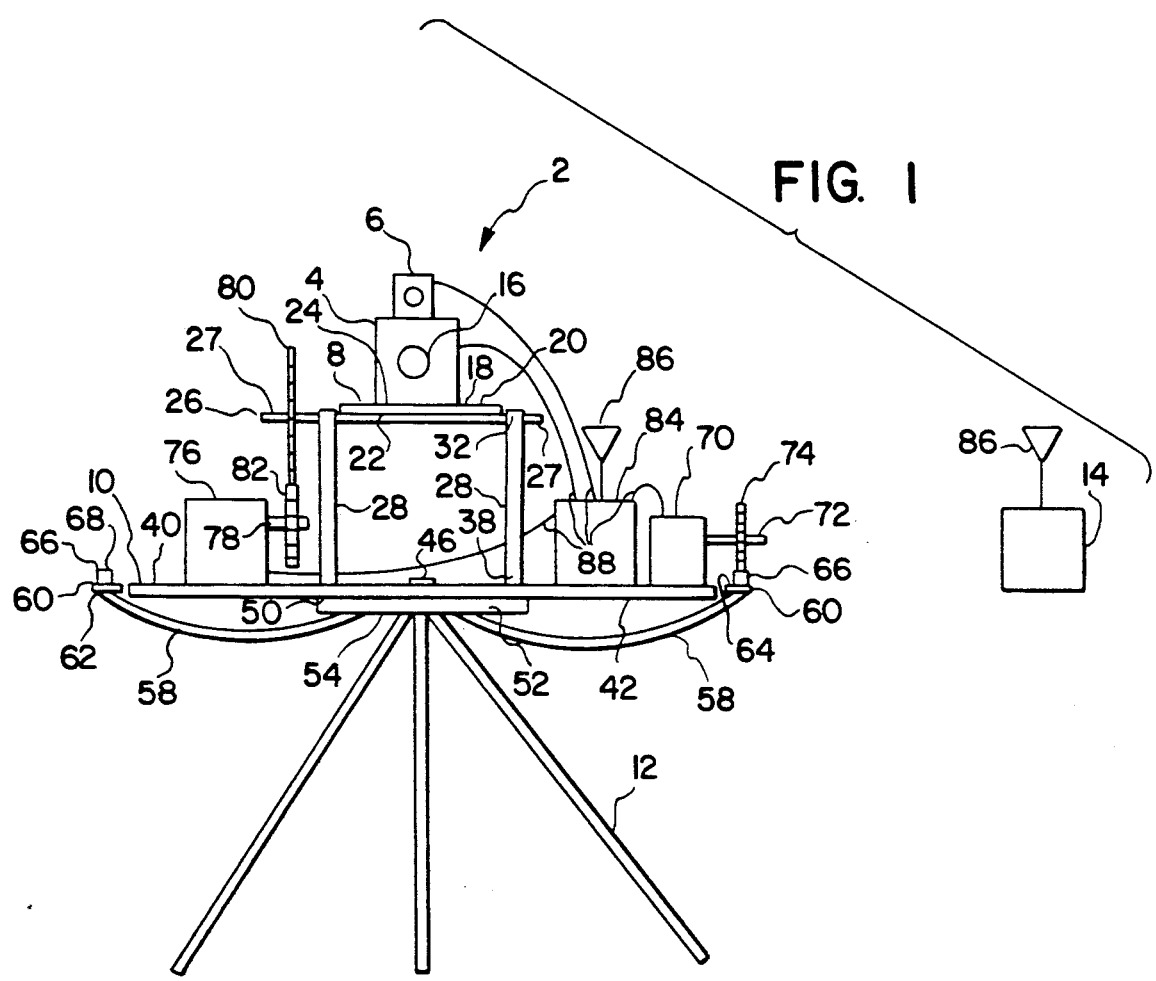
FIG. 1 is a plan view of a remote control camera apparatus in accordance with this invention with the front half portion of a drive ring removed and a remote transmitter shown adjacent thereto.
Figure 2:
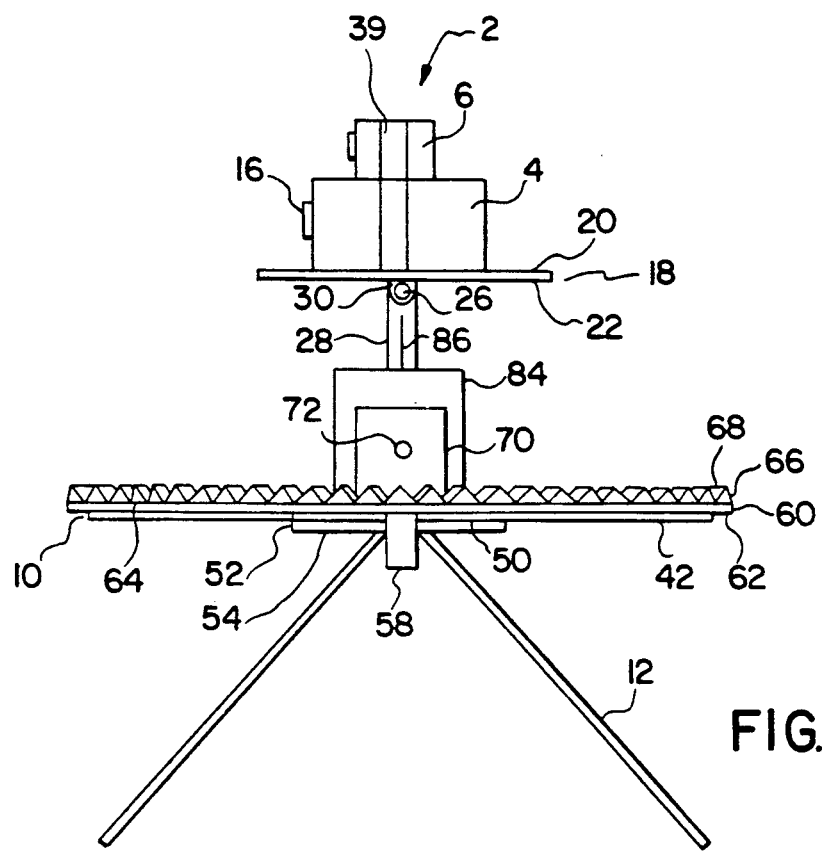
FIG. 2 is a side elevation view of the apparatus shown in FIG. 1 with the front half portion of the drive ring included and the remote transmitter not shown.
Figure 3:
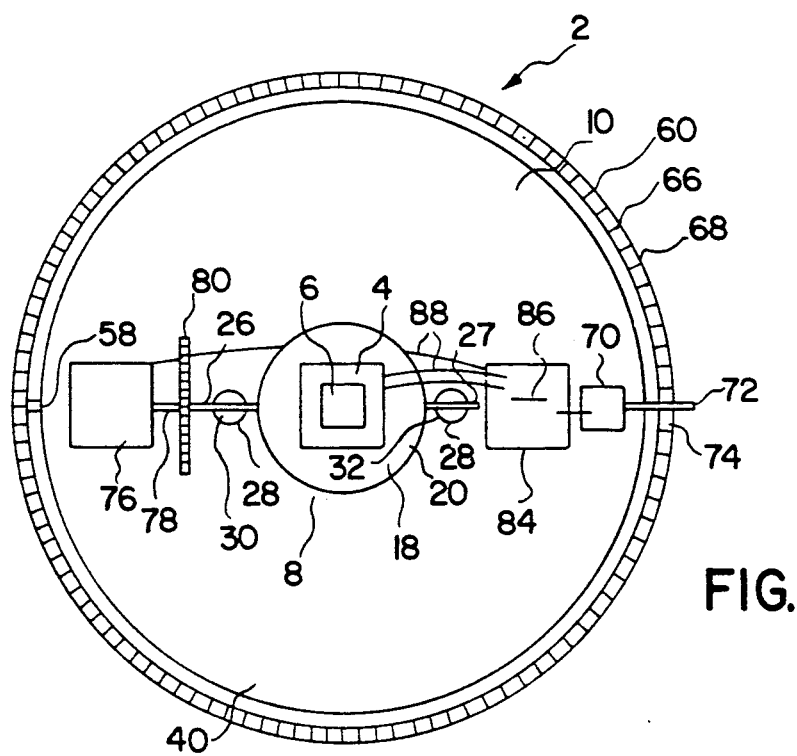
FIG. 3 is a top plan view of the apparatus shown in FIG. 2.
Figure 4:
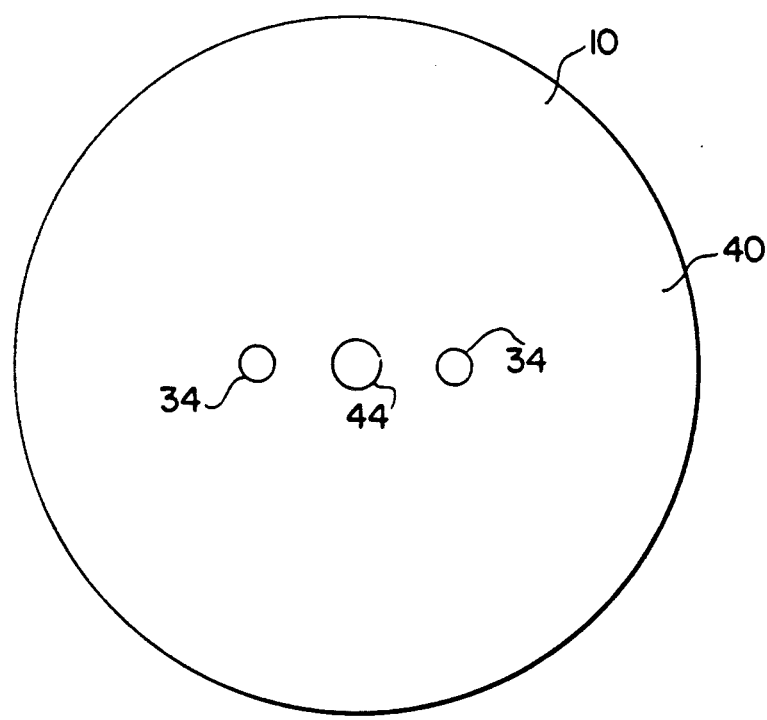
FIG. 4 is a top plan view of a turntable that rotates the remote control camera apparatus in accordance with this invention.
Figure 5:
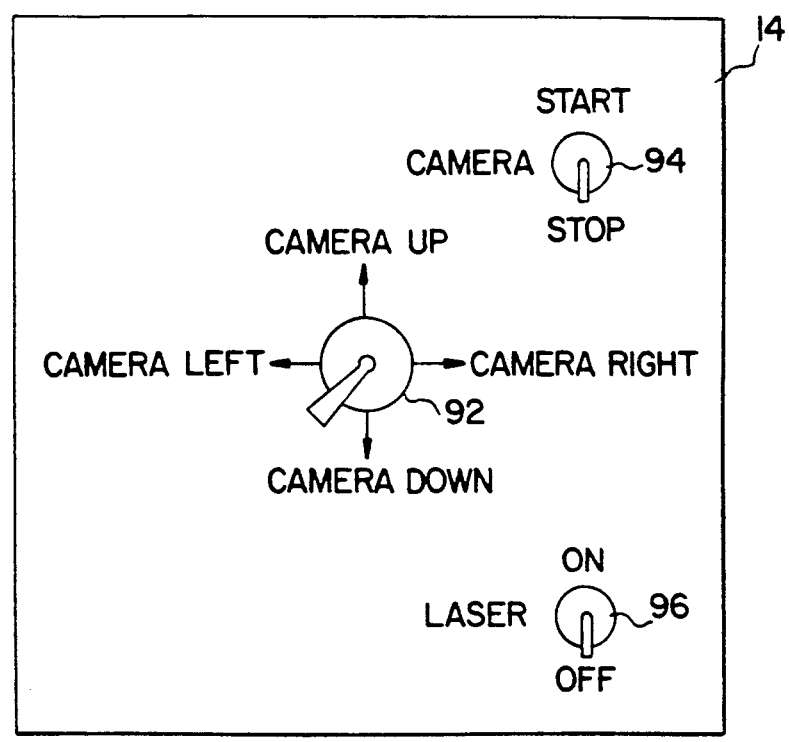
FIG. 5 shows the remote transmitter's control switches for operating the remote control camera apparatus in accordance with this invention.
Figure 6:
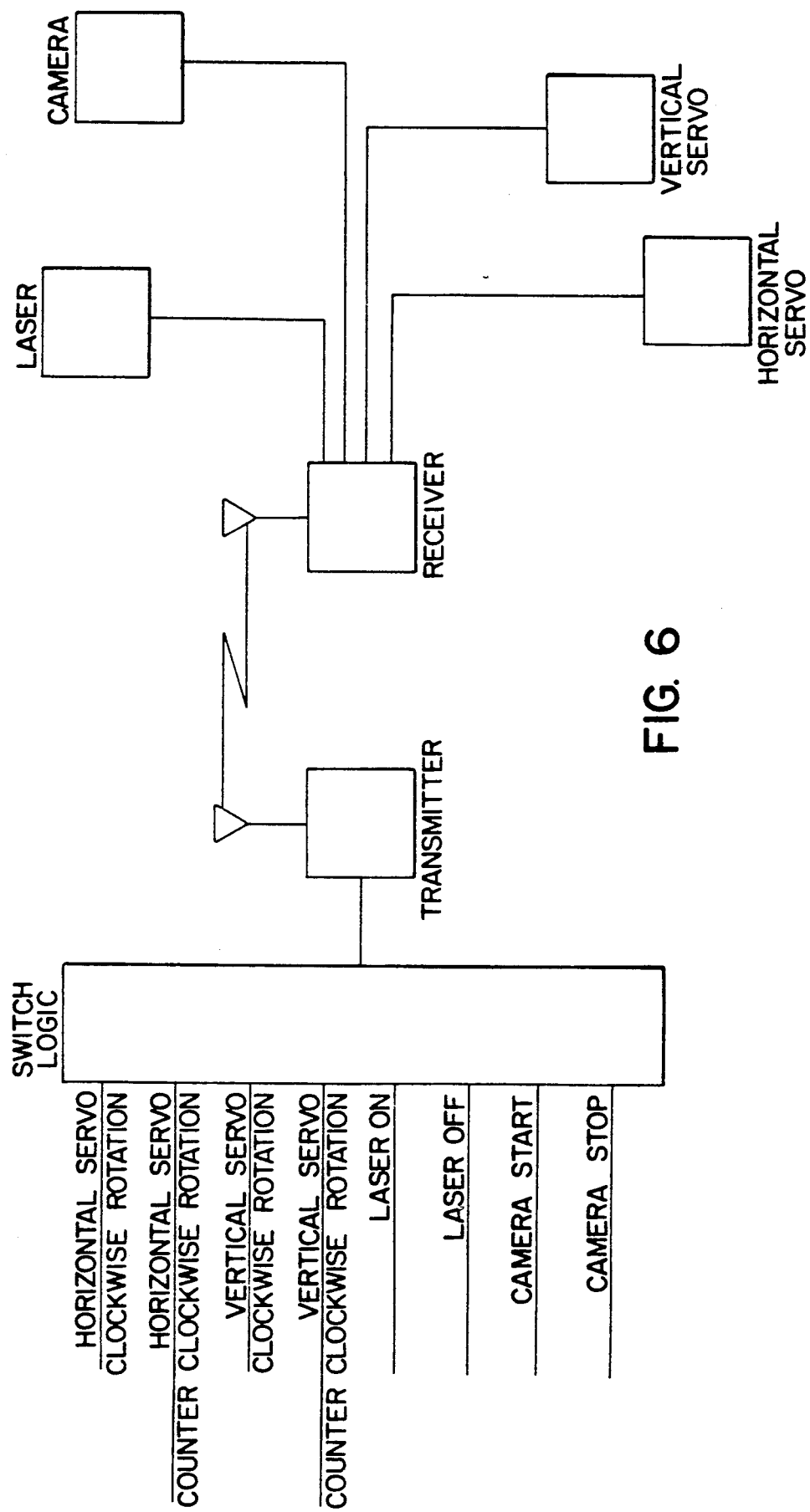
FIG. 6 is a block diagram showing the connection scheme of the components of the remote control camera apparatus and the remote transmitter in accordance with this invention.
Figure 7:
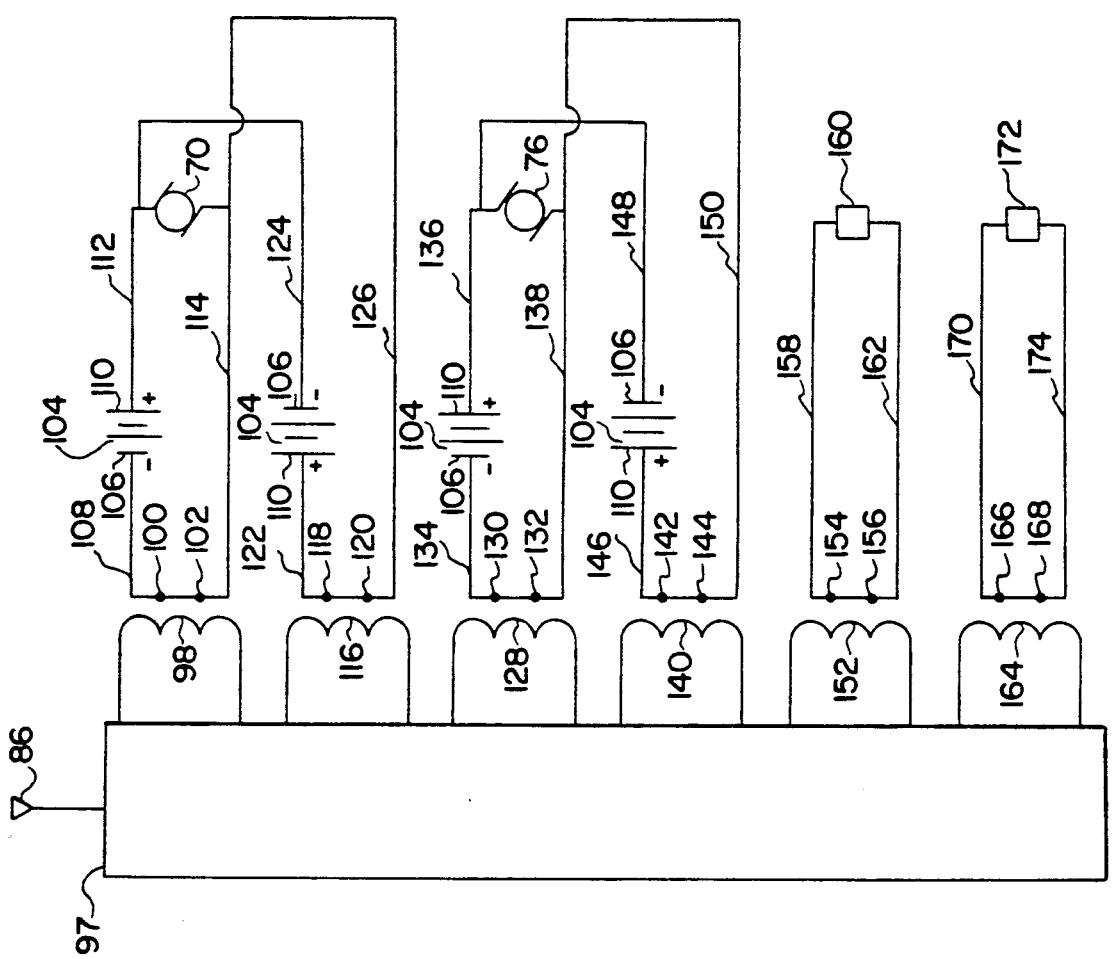
FIG. 7 is a schematic of the operating circuit for the remote control camera apparatus in accordance with this invention.
Figure 8:
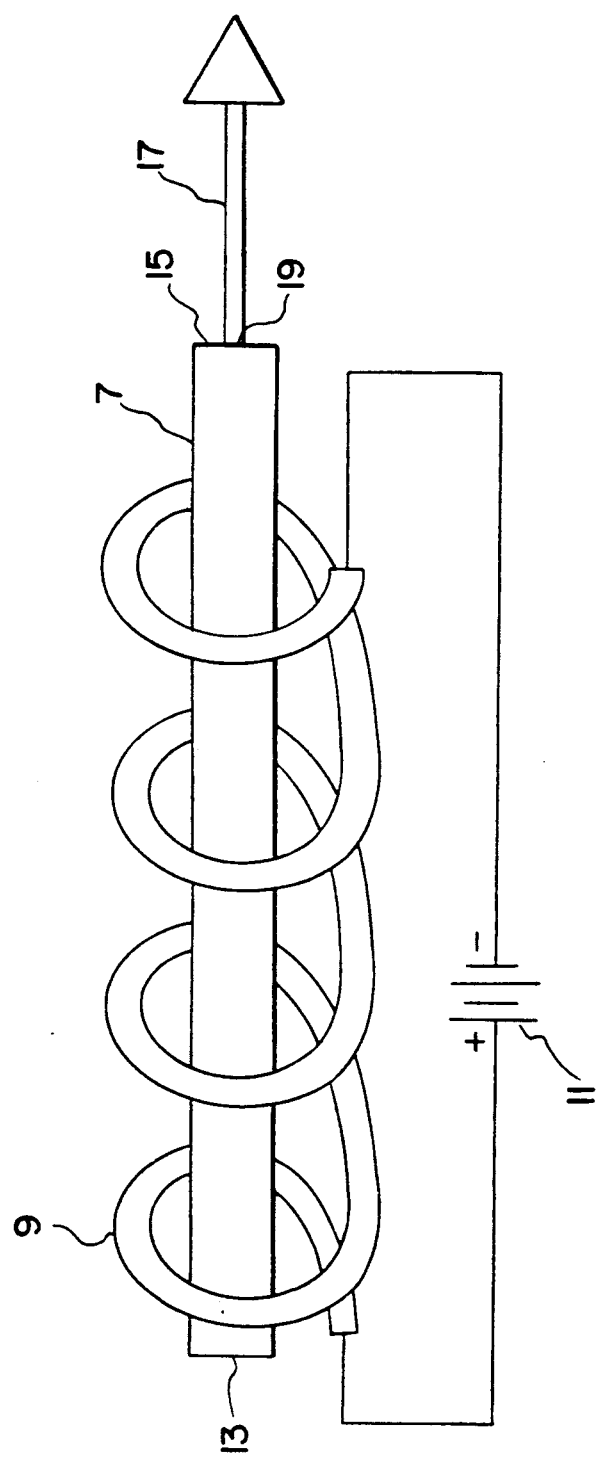
FIG. 8 is a schematic of a ruby laser in accordance with this invention.

A remote control camera apparatus 2 in accordance with the present invention includes a camera 4, a laser transmitter 6 adjacent to the camera 4, a gimbal 8 to move the camera 4 and laser transmitter 6 up and down throughout a 180° vertical arc, a turntable 10 to rotate the camera 4 and laser transmitter throughout a 360° horizontal arc, a tripod 12 to support all the aforementioned equipment, and a hand held radio wave transmitter 14 to allow a person to operate the equipment from a remote location.

The camera 4 may be a video camera or motion picture camera, although a still shot camera may be incorporated within the control scheme. The laser transmitter 6 positioned adjacent to the camera 4, is preferably mounted on the upper surface of the camera 4. The transmitter 6 directs a visible laser beam parallel to and slightly above the axis of the camera lens 16 thereby impinging the visible beam of light from the laser transmitter 6 on the viewing area that the camera lens 16 is focused on at a point which is slightly above the focal point of the camera and which is on a vertical centerline through the focal point.

Laser transmitters 6 are well known and a detailed explanation of their operation and components are not required. A ruby laser is utilized in this invention because it is relatively small and inexpensive. The ruby 7 is an artificially manufactured solid cylindrical piece of aluminum oxide crystal with a small percentage of chromium therein. A flash lamp 9 or strobe light is spirally wrapped around the longitudinal axis of the cylindrical ruby 7. A power source such as a D.C. battery 11 is coupled to the flash lamp 9 to initiate a flash of light that excites the electrons of chromium atoms to higher energy levels or orbits around the nucleus of the chromium atoms. This excited state lasts a relatively short period of time. An electron drops back to its original energy level thereby giving up energy in the form of a light photon. This light photon strikes another electron in a higher energy level forcing the electron to a lower energy level giving off another photon of light with the result being two light photons of the same frequency that eventually strike two more electrons in a higher energy level with the process repeating again. A multitude of light photons result from this process with a small percentage traveling parallel to the longitudinal axis of the ruby 7. The light photons traveling parallel to the longitudinal axis of the ruby 7 strike a first flat silver coated end 13 of the cylindrical ruby 7, reverse direction, then travel in an opposite direction until striking a second flat silver coated end 15 of the cylindrical ruby 7 to again reverse direction and repeat the operation thereby amplifying the light intensity within the ruby 7.

The laser beam 17 is generated by allowing a small percentage of the light photons traveling parallel to the longitudinal axis of the ruby 7 to escape through a small uncoated portion 19 of the second flat silver coated end 15 of the ruby 7. The laser beam is directed to the approximate center of the viewing area of the camera 4, at a point slightly above the focal point, to provide a camera operator a visual indicator of the camera's viewing area when the operator is at a location remote from the camera 4.

The gimbal 8 includes a solid, cylindrical, plastic platform 18 having a flat upper surface 20 and a flat lower surface 22 slightly spaced apart with a diameter slightly larger than the longitudinal dimension of the base 24 of the camera 4 placed thereon. A cylindrical platform support rod 26 is attached to the lower surface 22 of the platform 18 with the support rod 26 having a longitudinal dimension slightly longer than the diameter of the lower surface 22 thereby allowing the support rod 26 to extend diametrically across the lower surface 22 with each end 27 of the rod 26 extending slightly beyond the perimeter of the lower surface 22. Two small platform support columns 28 each having a groove 30 at an upper end 32 to receive the portion of support rod 26 that extends beyond the platform 18 perimeter, are vertically inserted into two recesses 34 in a turntable 28 and are inserted into the recesses 34 far enough to maintain stability when the support rod, with the platform attached thereto, is inserted into the grooves 30. The longitudinal dimension of the support columns is long enough to allow the support rod 26 to pivot the platform 18 to a vertical position without having the perimeter of the platform 18 touch the upper surface 40 of the turntable 10. The camera 4 and laser transmitter 6 are held in place by a strip 39 to the platform 18 thereby maintaining the positions of the camera 4 and transmitter 6 while the platform 18 pivots.

The turntable 10 is a solid, cylindrical, plastic structure having dimensions and configuration similar to the support platform 18 but with a larger diameter than the surfaces 20 and 22 of the platform 18. The upper surface 40 and the lower surface 42 of the turntable 38 are fixed in a horizontal plane. The recesses 34 are cylindrical in design and extend from the upper surface 40 into the turntable 10 to a point half the distance between the upper surface 40 and lower surface 42 of the turntable 10. The turntable 10 has a small circular aperture 44 at the center to receive a support post 46 therein.

The support post 46 is a short, solid, cylindrically shaped extension vertically mounted at a lower end to the center of a horizontal upper surface 50 of a support plate 52. The support plate 52 is disk shaped with the upper surface 50 smooth and small in diameter to reduce friction thereby allowing the turntable 10 to rotate thereon. The center of the lower surface 54 of the support plate 52 is attached to a tripod 12 that provides a stable stand to the aforementioned equipment.

The lower surface 54 of the support plate 52 has two ring support arms 58 attached thereto that extend radially outward and slightly upward in opposite directions to a position slightly beyond the perimeter of the turntable 10, and slightly below the horizontal plane of the upper surface 40 of the turntable 10. A drive ring 60 having an inner diameter slightly larger than the diameter of the turntable 36, and an outer diameter large enough to provide a drive ring 60 having a lower surface 62 with enough surface area to allow the support arms 58 to attach thereto. The drive ring 60 has a flat upper surface 64 in the same horizontal plane with the upper surface 40 of the turntable 10. A plurality of ring teeth 66 are mounted to and spaced equidistant around the perimeter of the drive ring 60.

The ring teeth 66 have a triangle configuration when viewed from the side with the base attached to the upper surface 64 of the drive ring 60. The ring teeth 66 have a square configuration when viewed from the front with an upper edge 68 in a line parallel with the upper surface 40 of the turntable 10 and passing through the center of the turntable 10.

A horizontal servo motor 70 is mounted to the upper surface 40 of the turntable 36 a distance from the center of the turntable 10 slightly larger than the radius of the platform 18. The servo motor 70 has a shaft 72 extending parallel to the upper surface 40 of the turntable 10 and radially outward from the vertical axis of the turntable 10 past the outer perimeter of the drive ring 60. A horizontal drive gear 74 is attached to the drive shaft 72 and meshed with the ring teeth 66.

A vertical servo motor 76 is mounted to the upper surface 40 of the turntable 10 a distance from the center of the turntable 10 slightly longer than the radius of the platform 18. The vertical servo motor 76 has a drive shaft 78 extending below one end 27 of the support rod 26 and in the same vertical plane. The longitudinal axis of the drive shaft 78 is in a plane parallel to the longitudinal axis of the support rod 26. A support rod gear 80 is secured to the support rod 26. A vertical drive gear 82 is secured to the drive shaft 78 of the vertical servo motor 76 and meshed with the support rod gear 80.

A radio wave receiver 84 having an antenna 86 is mounted to the upper surface 40 of the turntable 10. Four pairs of wires 88 connect the radio receiver 84 to the camera 4, laser transmitter 6, horizontal servo motor 70, and vertical servo motor 76. The hand held radio wave transmitter 14 transmits a radio wave to the receiver 84 when a camera control switch 92, camera on-off switch 94, or laser on-off switch 96 are moved to an activate position.

The camera control switch 92 is normally in an inactive position. When the control switch 92 is moved right or left, a radio wave is transmitted to the receiver 84 and activates the horizontal servo motor 70 and moves the camera 4 toward the right or left respectively. When the control switch 92 is moved up or down, a radio wave is transmitted to the receiver 84 and activates the vertical servo motor 76 and moves the camera 4 up or down respectively. The camera on-off switch 94 is a two position toggle switch with the on position being active and the off position inactive. When the camera on-off switch 94 is placed in the on position, a radio wave is transmitted to the receiver 84 that turns on the camera 4. When the camera on-off switch 94 is placed in the off position the radio wave is discontinued thereby automatically turning off the camera 4. The laser on-off switch 96 is a two position toggle switch with the on position being active and the off position inactive. When the laser on-off switch 96 is placed in the on position, a radio wave is transmitted to the receiver 84 that turns on the laser transmitter 6. When the laser on-off switch 96 is placed in the off position, the radio wave is discontinued thereby automatically turning off the laser transmitter 6.

Radio receivers and transmitters are well known and their operation need not be explained in detail here, including components of a radio receiver which process the incoming RF signal to produce a voltage output. Briefly, the antenna 86 which picks up the radio waves is coupled to the input of an RF amplifier. The output of the RF amplifier is applied to an electronic component called a mixer which is also connected to an oscillator. The mixer then "mixes" the R.F. signal from the RF amplifier with the oscillating signal from the oscillator to produce an output signal of a lower intermediate frequency. This lower intermediate frequency signal is then fed to an intermediate frequency amplifier and that amplified signal is applied to an electronic component known as a discriminator which in turn produces an output voltage that is fed to a relay to energize a relay coil.

The radio receiver 84 utilized in the present control scheme receives six different control signals from the remote transmitter 14 that activates six independent circuits that incorporate the amplifier, mixer, oscillator, discriminator combination 97 detailed in the preceding paragraph. A first relay coil 98 inside the receiver 84 is energized by a transmitted radio wave when the control switch 92 on the transmitter 14 is moved left to the "camera left" position. When the first relay coil 98 is energized, it attracts the movable relay contact 100 which is normally biased to the contact open position and moves it into the contact closed position in contact with stationary relay contact 102. A battery 104 inside the receiver 84 to provide power to the horizontal servo motor 70 has a negative terminal 106 connected to the movable relay contact 100 by conductor 108, and a positive terminal 110 connected to a first conductor of the horizontal servo motor 70 by conductor 112. The circuit is completed by conductor 114 which connects to a second conductor of the horizontal servo motor 70 and to the stationary relay contact 102. Energizing the first coil 98 directs power from the battery 104 to the horizontal servo motor 70 which forces the motor 70 to rotate in a counter-clock wise direction when viewing the motor 70 from the shaft side. The motor 70 rotating counter-clockwise forces the turntable 10 to rotate clockwise when viewed from above thereby moving the camera's 4 field of view to the left of a person operating the radio transmitter 14 while facing the camera 4.

A second relay coil 116 inside the receiver 84 is energized by a transmitted radio wave when the control switch 92 on the transmitter 14 is moved right to the "camera right" position. When the second relay coil 116 is energized, it attracts the movable relay contact 118 which is normally biased to the contact open position and moves it into the contact closed position in contact with stationary relay contact 120. Battery 104 has the positive terminal 110 connected to the movable relay contact 118 by conductor 122, and the negative terminal 10 connected to the first conductor of the horizontal servo motor 70 by conductor 124. The circuit is completed by conductor 126 which connects to the second conductor of the horizontal servo motor 70 and to the stationary relay contact 120. Energizing the second coil 116 directs power from the battery 104 to the horizontal servo motor 70 at polarities reversed from that described in the operation of the first coil 98 thereby forcing the motor 70 to rotate in a clockwise direction when viewing the motor 70 from the shaft side. The motor 70 rotating clockwise forces the turntable 10 to rotate counter-clockwise when viewed from above thereby moving the camera's 4 field of view to the right of a person operating the radio transmitter 14 while facing the camera 4.

A third relay coil 128 inside the camera 84 is energized by a transmitted radio wave when the control switch 92 on the transmitted 14 is moved up to the "camera up" position. When the third relay coil 128 is energized, it attracts the movable relay contact 130 which is normally biased to the contact open position and moves it into the contact closed position in contact with stationary relay contact 132. Battery 104 has the negative terminal 106 connected to the movable relay contact 130 by conductor 134, and the positive terminal 110 connected to a first conductor of the vertical servo motor 76 by conductor 136. The circuit is completed by conductor 138 which connects to a second conductor of the vertical servo motor 76 and to the stationary relay contact 132. Energizing the third coil 128 directs power from the battery 104 to the vertical servo motor 76 which forces the motor 76 to rotate in a counter-clockwise direction when viewing the motor 76 from the shaft side. The motor 76 rotating counter-clockwise forces the support rod gear 70 to rotate clockwise when viewed from the vertical servo motor shaft side thereby moving the camera's 4 field of view upward.

A fourth relay coil 140 inside the receiver 84 is energized by a transmitted radio wave when the control switch 92 on the transmitter 14 is moved down to the "camera down" position. When the fourth relay coil 140 is energized, it attracts the movable relay contact 142 which is normally biased to the contact open position and moves it into the contact closed position in contact with stationary relay contact 144. Battery 104 has the positive terminal 110 connected to the movable relay contact 142 by conductor 146, and the negative terminal 106 connected to the first conductor of the vertical servo motor 76 by conductor 148. The circuit is completed by conductor 150 which connects to the second conductor of the vertical servo motor 76 and to the stationary relay contact 144. Energizing the fourth coil 140 directs power from the battery 104 to the vertical servo motor 76 at polarities reversed from that described in the operation of the third coil 128 thereby forcing the motor 76 to rotate in a clockwise direction when viewing the motor 76 from the shaft side. The motor 76 rotating clockwise forces the support rod gear 80 to rotate counter-clockwise when viewed from the vertical servo motor shaft side thereby moving the camera's 4 field of view downward.

A fifth relay coil 152 inside the receiver 84 is energized by a transmitted radio wave when the camera on-off switch 94 is moved to the "on" position. When the fifth relay coil 152 is energized, it attracts the movable relay contact 154 which is normally biased to the contact open position and moves it into the contact closed position in contact with stationary relay contact 156. A first conductor 158 connects the movable relay contact 154 to a camera run circuit 160 in the camera 4. A second conductor 162 connects the camera run circuit 160 to the stationary relay contact 156 thereby completing the camera on control circuit when the fifth relay coil 152 is energized. When the camera on-off switch 94 is moved to the "off" position, the fifth relay coil 152 is de-energized thereby turning off the camera 4.

A sixth relay coil 164 inside the receiver 84 is energized by a transmitted radio wave when the laser on-off switch 96 is moved to the "on" position. When the sixth relay coil 164 is energized, it attracts the movable relay contact 166 which is normally biased to the contact open position and moves it into the contact closed position in contact with stationary relay contact 168. A first conductor 170 connects the movable relay 166 to a laser run circuit 172 in the laser transmitter 6. A conductor 174 connects the laser run circuit 172 to the stationary relay contact 156 thereby completing the laser transmitter on control circuit when the sixth relay coil 164 is energized. When the laser on-off switch 96 is moved to the "off" position, the sixth relay coil 164 is de-energized thereby turning off the laser transmitter 6.

The remote control camera 2 operates as follows:

A person, after adjusting the tripod 12 and leveling the equipment connected thereto, moves into the viewing area of the camera 4 with the hand held transmitter 14. The person moves the laser on-off switch 96 on the transmitter 14 to the on position thereby activating the laser transmitter 6 which generates a visible laser beam that indicates the approximate center of the viewing area of the camera lens 16. Assuming the laser beam is to the person's right and low, the camera control switch 92 would be moved to the left thereby activating the norizontal servo motor 70 which turns the horizontal drive gear 74 that is attached to the motor shaft 72. The horizontal drive gear 74 is meshed with the ring teeth 66 mounted to the stationary drive ring 60. The rotating drive gear 74 and the horizontal servo motor 70 being secured to the turntable 10, forces the turntable 10 to rotate on the support plate until the laser beam indicates the desired horizontal position of the camera 16.

The camera control switch 92 would then be moved up thereby deactivating the horizontal servo motor 70 and activating the vertical servo motor 76 which turns the vertical drive gear 82 that is attached to the motor shaft 78. The vertical drive gear 82 is meshed with the support rod gear 80 secured to the support rod 26 that has the platform 18 attached thereto. The rotating vertical drive gear 82 turns the support rod gear 80 which turns the support rod 26 thereby pivoting the platform 18 to raise the visible laser beam up until the desired vertical position of the camera 4 is set.

The camera control switch 92 is moved to the inactive position, the laser on-off switch 96 is moved to the off position, and the camera on-off switch 94 is moved to the on position thereby activating the camera 4 that has been directed upon the desired viewing area. When the person moves to a new viewing area, the aforementioned procedure is easily repeated. Although the procedure details one operation at any given time, the vertical servo motor 76 or horizontal servo motor 70, the camera 4, and the laser transmitter 6 could all be operated during the same time interval.

I claim:

1. A remote control and camera combination comprising a camera, indicating means to indicate a selected point within a viewing area of said camera to a camera operator at a location remote to said camera, said selected point being a known distance and direction from the center of a said viewing area, horizontal movement means to move said camera and said indicating means in tandem in a horizontal direction, vertical movement means to move said camera and said indicating means in tandem in a vertical direction, and remote control means to control said vertical movement means, said horizontal movement means, said indicating means, and said camera from a location remote to said camera.

2. A remote control and camera combination as set forth in claim 1, wherein said indicating means includes a generating device that discharges a visible signal.

3. A remote control and camera combination as set forth in claim 2, wherein said generating device includes a laser transmitting having a visible laser beam transmitted therefrom.

4. A remote control and camera combination as set forth in claim 1, wherein said horizontal movement means includes a horizontal servo motor having a shaft protruding therefore, a horizontal drive gear connected to said shaft, a turntable having an upper surface set in a horizontal plane with said horizontal servo motor attached thereto, a support plate to support said turntable and allow said turntable to rotate thereon, a drive ring attached to said support plate, said drive ring having a plurality of ring teeth secured thereto to mesh with said horizontal drive gear, and horizontal power means to supply power to said horizontal servo motor thereby forcing said horizontal servo motor to rotate and move said turntable.

5. A remote control and camera combination as set forth in claim 1, wherein said vertical movement means includes a vertical servo motor having a shaft protruding therefrom, a vertical drive gear connected to said shaft, said vertical drive motor being attached to said turntable, a support rod having a longitudinal axis set in a horizontal plane, a platform secured to said support rod, a plurality of support columns to support said support rod with said support columns secured to said turntable, said support columns separating said support rod from said turntable a distance that allows said platform to pivot throughout a vertical plane without touching said turntable, a support rod gear attached to said support rod to mesh with said vertical drive gear, said camera and said indicating means being secured to said platform, and vertical power means to supply power to said vertical servo motor thereby forcing said vertical servo motor to rotate and move said platform.

6. A remote control and camera combination as set forth in claim 1, wherein said remote control means includes a transmitter and a receiver, said transmitter including a camera control member, a camera on-off member, and a laser on-off member, said receiver including a plurality of wire pairs connecting said receiver to said camera, said laser transmitter, said horizontal drive motor, and said vertical drive motor.

7. A remote control and camera combination as set forth in claim 6, wherein said transmitter instructs said receiver to activate and de-activate said horizontal drive motor, said vertical drive motor, said camera, or said laser transmitter.

8. A remote control and camera combination as set forth in claim 6, wherein said transmitter and said receiver are linked via radio wave.

9. A remote control and camera combination as set forth in claim 6, wherein said camera control member includes a switch having an inactive neutral position and four active positions corresponding to four directions of motion of said camera.

10. A remote control and camera combination as set forth in claim 6, wherein said camera on-off member includes a two position switch that turns said camera on and off.

11. A remote control and camera combination as set forth in claim 6, wherein said laser on-off member includes a two position switch that turns said laser on and off.

12. A remote control and camera combination as set forth in claim 4, wherein said horizontal power means includes a power member, a first relay coil energized by a first electronic component means and a second relay coil energized by a second electronic component means, said first relay coil having a movable contact normally biased to the open position and a stationary contact whereby said movable contact of said first relay coil moves into a contact closed position in contact with said stationary relay contact of said first relay coil when said first relay coil is energized, said second relay coil having a movable contact normally biased to the open position and a stationary contact whereby said movable contact of said second relay coil moves into a contact closed position in contact with said stationary relay contact of said second relay coil when said second relay coil is energized, electrical conductor members to electrically connect said power member to said movable contact and said stationary contact of said first relay coil, and to said horizontal servo motor to rotate said horizontal servo motor in a first direction, and electrical conductor members to electrically connect said power member to said movable contact and said stationary contact of said second relay coil, and to said horizontal servo motor to rotate said horizontal servo motor in a second direction.

13. A remote control and camera combination as set forth in claim 5, wherein said vertical power means includes a power member, a third relay coil energized by a third electronic means and a fourth relay coil energized by a fourth electronic component means, said third relay coil having a movable contact normally biased to the open position and a stationary contact whereby said movable contact of said third relay coil moves into a contact closed position in contact with said stationary relay contact of said third relay coil when said third relay coil is energized, said fourth relay coil having a movable contact normally biased to the open position and a stationary contact whereby said movable contact of said fourth relay coil moves into a contact closed position in contact with said stationary relay contact of said fourth relay coil when said fourth relay coil is energized, electrical conductor members to electrically connect said power member to said movable contact and said stationary contact of said third relay coil, and to said vertical servo motor to rotate said vertical servo motor in a first direction, and electrical conductor members to electrically connect said power member to said movable contact and said stationary contact of said fourth relay coil, and to said vertical servo motor to rotate said vertical servo motor in a second direction.

14. A remote control and camera combination as set forth in claim 6, wherein said receiver includes a fifth relay coil energized by electronic component means, said fifth relay having a movable contact normally biased to the open position and a stationary contact whereby said movable contact of said fifth relay coil moves into a contact closed position in contact with said stationary relay contact of said fifth relay coil when said fifth relay coil is energized, a camera run circuit within said camera, and electrical conductor members to electrically connect said movable contact and said stationary contact of said fifth relay coil to said camera run circuit to start camera when said fifth relay coil is energized and to stop said camera when said fifth relay coil is de-energized.

15. A remote control and camera combination as set forth in claim 6, wherein said receiver includes a sixth relay coil energized by electronic component means, said sixth relay coil having a movable contact normally biased to the open position and a stationary contact whereby said movable contact of said sixth relay coil moves into a contact closed position in contact with said stationary relay contact of said sixth relay coil when said sixth relay coil is energized, a laser transmitter run circuit within said laser transmitter, and electrical conductor members to electrically connect said movable contact and said stationary contact of said sixth relay coil to said laser transmitter run circuit to start said laser transmitter when said sixth relay coil is energized and to stop said laser transmitter when said sixth relay coil is de-energized.

16. A remote control and camera combination as set forth in claim 12, wherein said first electronic component means includes an amplifier to amplify a radio frequency signal, an oscillator to generate an oscillating signal, a mixer to mix an amplified radio frequency signal from said amplifier with said oscillating signal thereby producing an output signal from said mixer having a lower intermediate frequency, an intermediate frequency amplifier to amplify said intermediate frequency signal, and a discriminator to receive an amplified intermediate frequency signal from said intermediate frequency amplifier, said discriminator producing an output voltage to energize said first relay coil.

17. A remote control and camera combination as set forth in claim 12, wherein said second electronic component means includes an amplifier to amplify a radio frequency signal, an oscillator to generate an oscillating signal, a mixer to mix an amplified radio frequency signal from said amplifier with said oscillating signal thereby producing an output signal from said mixer having a lower intermediate frequency, an intermediate frequency amplifier to amplify said intermediate frequency signal, and a discriminator to receive an amplified intermediate frequency signal from said intermediate frequency amplifier, said discriminator producing an output voltage to energize said second relay coil.

18. A remote control and camera combination as set forth in claim 13, wherein said third electronic component means includes an amplifier to amplify a radio frequency signal, an oscillator to generate an oscillating signal, a mixer to mix an amplified radio frequency signal from said amplifier with said oscillating signal thereby producing an output signal from said mixer having a lower intermediate frequency, an intermediate frequency amplifier to amplify said intermediate frequency signal, and a discriminator to receive an amplified intermediate frequency signal from said intermediate frequency amplifier, said discriminator producing an output voltage to energize said third relay coil.

19. A remote control and camera combination as set forth in claim 13, wherein said fourth electronic component means includes an amplifier to amplify a radio frequency signal, an oscillator to generate an oscillating signal, a mixer to mix an amplified radio frequency signal from said amplifier with said oscillating signal thereby producing an output signal from said mixer having a lower intermediate frequency, an intermediate frequency amplifier to amplify said intermediate frequency signal, and a discriminator to receive an amplified intermediate frequency signal from said intermediate frequency amplifier, said discriminator producing an output voltage to energize said fourth relay coil.

20. A remote control and camera combination as set forth in claim 14, wherein said fifth electronic component means includes an amplifier to amplify a radio frequency signal, an oscillator to generate an oscillating signal, a mixer to mix an amplified radio frequency signal from said amplifier with said oscillating signal thereby producing an output signal from said mixer having a lower intermediate frequency, an intermediate frequency amplifier to amplify said intermediate frequency signal, and a discriminator to receive an amplified intermediate frequency signal from said intermediate frequency amplifier, said discriminator producing an output voltage to energize said fifth relay coil.

21. A remote control and camera combination as set forth in claim 14, wherein said sixth electronic component means includes an amplifier to amplify a radio frequency signal, an oscillator to generate an oscillating signal, a mixer to mix an amplified radio frequency signal from said amplifier with said oscillating signal thereby producing an output signal from said mixer having a lower intermediate frequency, an intermediate frequency amplifier to amplify said intermediate frequency signal, and a discriminator to receive an amplified intermediate frequency signal from said intermediate frequency amplifier, said discriminator producing an output voltage to energize said sixth relay coil.

22. A remote control and camera combination comprising a camera, indicating means to generate and transmit an identifiable locating signal to a selected point within the viewing area of said camera, said locating signal being recognizable to camera operator at a location spaced apart from said camera, horizontal movement means to move said camera and said locating signal generated by said indicating means in a horizontal direction, and remote control means to control said horizontal movement means to move said camera and said locating signal in said horizontal direction, said locating signal generated and transmitted by said indicating means being separate and apart from the objects within said viewing area of said camera prior to transmission of said locating signal thereto.

* * * * *